United States Patent
Yurugi et al.

(10) Patent No.: US 8,284,718 B2
(45) Date of Patent: Oct. 9, 2012

(54) WIRELESS COMMUNICATION SYSTEM HAVING MIMO COMMUNICATION CAPABILITY AND HAVING MULTIPLE RECEIVING ANTENNAS TO BE SELECTED

(75) Inventors: Hiroyuki Yurugi, Osaka (JP); Wataru Noguchi, Hyogo (JP); Masahiko Nagoshi, Osaka (JP); Sotaro Shinkai, Osaka (JP); Akihiko Shiotsuki, Osaka (JP)

(73) Assignee: Panasonic Corporation, Osaka (JP)

( * ) Notice: Subject to any disclaimer, the term of this patent is extended or adjusted under 35 U.S.C. 154(b) by 289 days.

(21) Appl. No.: 12/743,296

(22) PCT Filed: Nov. 27, 2008

(86) PCT No.: PCT/JP2008/003492
§ 371 (c)(1),
(2), (4) Date: May 17, 2010

(87) PCT Pub. No.: WO2009/072255
PCT Pub. Date: Jun. 11, 2009

(65) Prior Publication Data
US 2010/0246496 A1      Sep. 30, 2010

(30) Foreign Application Priority Data
Dec. 4, 2007  (JP) .................................. 2007-313343

(51) Int. Cl.
*H04W 4/00*   (2009.01)
*H04B 7/02*   (2006.01)
*H04B 7/00*   (2006.01)
(52) U.S. Cl. ......... 370/328; 370/334; 375/267; 455/500
(58) Field of Classification Search .................. 375/260; 455/500
See application file for complete search history.

(56) References Cited

U.S. PATENT DOCUMENTS 7,418,053 B2 *  8/2008  Perlman et al. ............... 375/267
7,599,420 B2 * 10/2009  Forenza et al. ............... 375/141
(Continued)

FOREIGN PATENT DOCUMENTS
CA             2604105 C  *  6/2011
(Continued)

OTHER PUBLICATIONS

H. Zhang, A.F. Molisch, J. Zhang, Dec. 2006, Applying Antenna Selection in WLANs for Achieving Broadband Multimedia Communications, Mitsubishi Electric Research Laboratories, TR2006-113, p. 1-10.*

(Continued)

*Primary Examiner* — Andrew Chriss
*Assistant Examiner* — Amy Ling
(74) *Attorney, Agent, or Firm* — Wenderoth, Lind & Ponack, L.L.P.

(57) ABSTRACT

Before start of streaming, a server apparatus obtains from client apparatuses their respective numbers of antenna combinations, determines a training time t1 according to the maximum of the numbers of antenna combinations, and notifies the client apparatuses of the training time t1. Each client apparatus determines a training time t2 required to estimate transmission path conditions for one antenna combination, based on the training time t1. The server apparatus transmits a training signal during the training time t1. Each client apparatus estimates transmission path conditions using the training signal during the training time t2 for each antenna combination, and selects and sets an antenna combination based on the estimated transmission path conditions.

10 Claims, 8 Drawing Sheets

U.S. PATENT DOCUMENTS

| | | | |
|---|---|---|---|
| 2005/0003863 A1 | 1/2005 | Gorokhov | |
| 2005/0128983 A1* | 6/2005 | Kim et al. | 370/334 |
| 2005/0276347 A1* | 12/2005 | Mujtaba et al. | 375/299 |
| 2006/0114813 A1 | 6/2006 | Seki et al. | |
| 2006/0223450 A1 | 10/2006 | Dacosta | |
| 2007/0041457 A1* | 2/2007 | Kadous et al. | 375/260 |
| 2008/0139125 A1* | 6/2008 | Son et al. | 455/67.11 |
| 2009/0175374 A1 | 7/2009 | Seki et al. | |

FOREIGN PATENT DOCUMENTS

| | | |
|---|---|---|
| JP | 2005-509359 | 4/2005 |
| JP | 2006-324787 | 11/2006 |
| JP | 2007-214759 | 8/2007 |
| WO | 2005/004376 | 1/2005 |
| WO | 2006/104537 | 10/2006 |

OTHER PUBLICATIONS

Dhananjay A. Gore and Arogyaswami J. Paulraj, Fellow, IEEE, MIMO Antenna Subset Selection With Space-Time Coding, Oct. 2002, IEEE Transactions on Signal Processing, vol. 50, No. 10, p. 2580-2588.*

Shahab Sanayei and Aria Nosratinia, University of Texas at Dallas, Antenna Selection in MIMO Systems (Adaptive Antennas and MIMO Systems for Wireless Communications), Oct. 2004, 2004 IEEE Communications Magazine, p. 68-73.*

International Preliminary Report on Patentability issued Aug. 19, 2010 in International (PCT) Application No. PCT/JP2008/003492.

International Search Report issued Feb. 17, 2009 in International (PCT) Application No. PCT/JP2008/003492.

* cited by examiner

WIRELESS COMMUNICATION SYSTEM HAVING MIMO COMMUNICATION CAPABILITY AND HAVING MULTIPLE RECEIVING ANTENNAS TO BE SELECTED

TECHNICAL FIELD

The present invention relates to a wireless communication system and a wireless communication method configured for Multiple-Input Multiple-Output (MIMO). More particularly, the present invention relates to a wireless communication system and a wireless communication method having a MIMO communication capability and having multiple receiving antennas to be selected.

BACKGROUND OF THE INVENTION

In today's wireless communication systems, a spatial multiplexing transmission technique is becoming widely used, in which a transmitting apparatus multiplexes and transmits different data streams in parallel through multiple transmitting antennas, and similarly, a receiving apparatus receives the data streams through multiple receiving antennas and demultiplexes the data streams, thus increasing a transmission capacity in proportion to the number of transmitting antennas. In addition, a standardization process of IEEE802.11n, which is a wireless LAN standard adopting the MIMO scheme, is in progress.

FIG. 7 shows a configuration of a conventional and typical MIMO communication system. A MIMO transmitting apparatus 401 is provided with a MIMO transmission data processing circuit 411 for converting an inputted data stream into a plurality m of data streams S1 to Sm; transmitter circuits 412-1 to 412-m for processes of the respective data streams S1 to Sm, such as data modulation, D/A conversion, quadrature modulation, upconversion, filtering, etc.; and antenna elements 413-1 to 413-m respectively connected to the transmitter circuits 412-1 to 412-m. Radio signals transmitted from the respective antenna elements 413-1 to 413-m are spatially multiplexed over a propagation channel represented by a matrix $H=(h_{ij})$, $1 \leq i \leq n$, $1 \leq j \leq m$, and the transmitted radio signals are received by a plurality n of antenna elements 421-1 to 421-n of a MIMO receiving apparatus 402. The MIMO receiving apparatus 402 is provided with the antenna elements 421-1 to 421-n; receiver circuits 422-1 to 422-n respectively connected to the antenna elements 421-1 to 421-n, for processes of the received radio signals, such as filtering, downconversion, quadrature detection, A/D conversion, demodulation, etc., to generate data streams X1 to Xn; and a MIMO receiving data processing circuit 423 for restoring one original data stream from the data streams X1 to Xn.

In the MIMO communication system, the MIMO transmitting apparatus 401 transmits known data (training information) to the MIMO receiving apparatus 402, and the MIMO receiving apparatus 402 estimates a propagation channel matrix H based on amplitude and phase information of the received data and the known data. As such, in the MIMO communication system, the communication quality is determined by not only electric field strengths of received signals, but also by phase differences between the signals, unlike a conventional SISO (Single-Input Single-Output) communication system. Hence, for example, even when moving one of the receiving antennas by one-half wavelength (about 3 cm at 5 GHz), its propagation channel changes, and accordingly, the communication quality also changes. Thus, it is important to appropriately design characteristics and arrangement of antennas.

Meanwhile, video streaming services are provided in transports with assigned seats, such as planes, long-distance trains, and buses, and in public facilities. It is advantageous to broadcast or multicast streaming data for such a service by using a MIMO communication system, since many users can enjoy a high quality video. Moreover, it is convenient for system installers to use a MIMO communication system, since the system installers do not have to experience difficulties in fixing and routing wires required for a wired communication system. FIG. 8 shows a schematic diagram of a wireless communication system for achieving data streaming using the MIMO communication scheme as described above. The wireless communication system of FIG. 8 includes one server apparatus 501 and multiple client apparatuses 502-1 to 502-5, and achieves its service by multicasting video/audio data by the server apparatus 501, and receiving and playing the video/audio data by each of the client apparatuses 502-1 to 502-5. By using the MIMO communication scheme in such service, it is possible to achieve video streaming with higher image quality. In this case, from the viewpoints of the manufacturing cost and the flexibility in installation, it is desirable that the multiple client apparatuses 502-1 to 502-5 have the same configuration, even their antennas are the same. However, there is a problem that the client apparatuses 502-1 to 502-5 have very different propagation channels depending on their installation locations, and the communication quality significantly degrades for some locations.

In order to solve such a problem, a selection diversity technique is commonly known in which each client apparatus is provided with multiple antennas, and receiving antennas are changed when the communication quality degrades. For example, a technique of Patent Literature 1 is known.

Citation List

Patent Literature

PATENT LITERATURE 1: PCT International Publication No. WO2005/004376.

SUMMARY OF INVENTION

Technical Problem

According to the technique of Patent Literature 1, the receiving apparatus estimates transmission path conditions for respective antennas during normal data transmission and reception. When a data error occurs and data retransmission is required, transmitting antennas used for the retransmission are determined according to the transmission path conditions estimated by the receiving apparatus, thus reducing errors in retransmitted data. The technique of Patent Literature 1 can be certainly said to be effective for data communications of the best effort type, since the retransmitted data can be transmitted to the receiving apparatus error-free. However, the technique is not appropriate for data communications of the guaranteed bandwidth type with a limited number of retransmissions, such as video or audio data communications, and for multicast communications without retransmission.

The object of the present invention is therefore to solve the above-described problem of the prior art, and to provide a wireless communication method for a wireless communication system having a MIMO communication capability and having multiple receiving antennas to be selected, the wireless communication method for selecting receiving antennas so as to improve the communication quality regardless of the installation locations of client apparatuses, and to provide a wireless communication system that operates according to such a wireless communication method.

Solution to Problem

According to the first aspect of the present invention, a wireless communication method is provided for distributing a data stream from a wireless server apparatus to a plurality of wireless client apparatuses using a Multiple-Input Multiple-Output (MIMO) wireless transmission scheme. Each of the wireless client apparatuses is provided with a larger number of antennas than the number of streams to be received by the wireless client apparatus, and among the antennas, selectively uses a combination of antennas including a number of antennas whose number is equal to the number of the streams to be received. The method includes the steps of, before start of streaming of the data stream: requesting, by the wireless server apparatus, the plurality of wireless client apparatuses for the number of antenna combinations; returning, by each of the wireless client apparatuses, the number of antenna combinations to the wireless server apparatus; determining, by the wireless server apparatus, a first training time according to the maximum of the returned numbers of antenna combinations, and notifying each of the wireless client apparatuses of the determined first training time; determining, by each of the wireless client apparatuses, a second training time required to estimate transmission path conditions between the wireless server apparatus and the wireless client apparatus for one antenna combination, based on the notified first training time; transmitting, by the wireless server apparatus, a training signal to each of the wireless client apparatuses during the first training time; estimating, by each of the wireless client apparatuses, the transmission path conditions using the training signal during the second training time for each of the antenna combinations; and selecting and setting, by each of the wireless client apparatuses, the antenna combination based on the estimated transmission path conditions.

In the wireless communication method, the transmission path conditions are estimated by evaluating at least two parameters of the transmission path conditions.

Moreover, in the wireless communication method, the parameters of the transmission path conditions include a parameter related to each of the antennas and a parameter related to correlations between the antennas.

Further, the wireless communication method further includes the step of determining, by each of the wireless client apparatuses, priorities of the antenna combinations based on one of the parameters of the transmission path conditions.

Furthermore, the wireless communication method further includes the step of selecting and setting, by each of the wireless client apparatuses, an antenna combination with the next highest priority after a current antenna combination based on the determined priorities of the antenna combinations, when the communication quality degrades.

According to the second aspect of the present invention, a wireless communication system is provided that distributes a data stream from a wireless server apparatus to a plurality of wireless client apparatuses using a Multiple-Input Multiple-Output (MIMO) wireless transmission scheme. Each of the wireless client apparatuses is provided with a larger number of antennas than the number of streams to be received by the wireless client apparatus, and among the antennas, selectively uses a combination of antennas including a number of antennas whose number is equal to the number of the streams to be received. Before start of streaming of the data stream, the wireless server apparatus requests the plurality of wireless client apparatuses for the number of antenna combinations. Each of the wireless client apparatuses returns the number of antenna combinations to the wireless server apparatus. The wireless server apparatus determines a first training time according to the maximum of the returned numbers of antenna combinations, and notifies each of the wireless client apparatuses of the determined first training time. Each of the wireless client apparatuses determines a second training time required to estimate transmission path conditions between the wireless server apparatus and the wireless client apparatus for one antenna combination, based on the notified first training time. The wireless server apparatus transmits a training signal to each of the wireless client apparatuses during the first training time. Each of the wireless client apparatuses estimates the transmission path conditions using the training signal during the second training time for each of the antenna combinations. Each of the wireless client apparatuses selects and sets the antenna combination based on the estimated transmission path conditions.

In the wireless communication system, the transmission path conditions are estimated by evaluating at least two parameters of the transmission path conditions.

Moreover, in the wireless communication system, the parameters of the transmission path conditions include a parameter related to each of the antennas and a parameter related to correlations between the antennas.

Further, In the wireless communication system, each of the wireless client apparatuses determines priorities of the antenna combinations based on one of the parameters of the transmission path conditions.

Furthermore, In the wireless communication system, each of the wireless client apparatuses selects and sets an antenna combination with the next highest priority after a current antenna combination based on the determined priorities of the antenna combinations, when communication quality degrades.

Advantageous Effects of Invention

The wireless communication method and the wireless communication system according to the present invention perform a training process for antenna selection before start of video/audio streaming, thus ensuring better communication quality during the streaming.

REFERENCE SIGNS LIST

100: server apparatus,
101: encoder circuit,

102: MIMO transmission data processing circuit,
103-1, 103-2, 103-3, 203-1, 203-2, 203-3: wireless communication circuits,
104-1, 104-2, 104-3, 201-1a, 201-1b, 201-2a, 201-2b, 201-3a, 201-3b: antenna element,
105, 206: controller,
200: client apparatus,
202-1, 202-2, 202-3: switch,
204: MIMO receiving data processing circuit,
205: decoder circuit,
301: number-of-antenna-combination request signal,
302: number-of-antenna-combination response signal,
303: training time information-signal,
304: training signal, and
305: MIMO data stream.

DETAILED DESCRIPTION OF THE INVENTION

Figure 1:
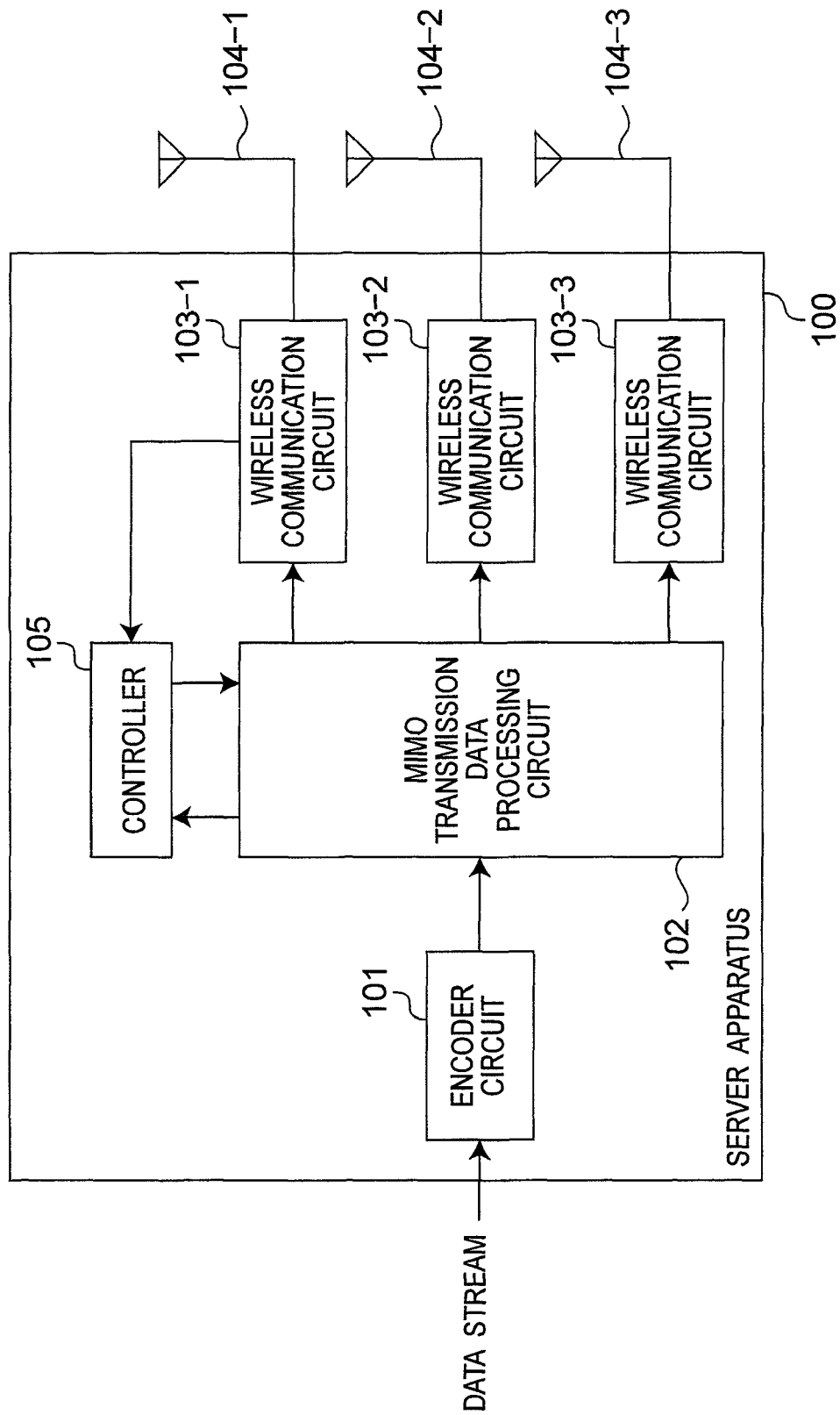
FIG. 1 is a block diagram showing a configuration of a server apparatus 100 of a wireless communication system according to a preferred embodiment of the present invention.
Figure 2:
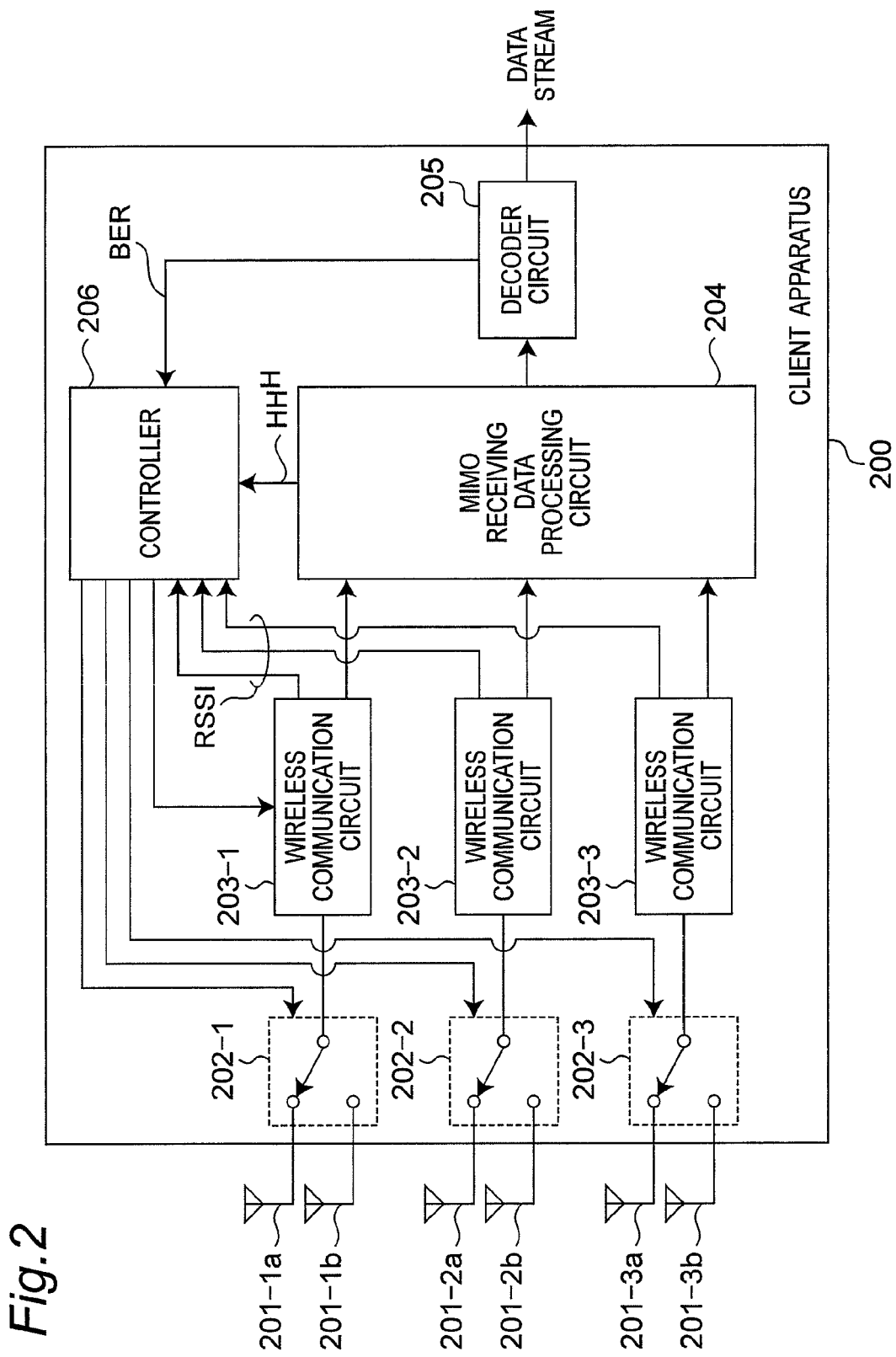
FIG. 2 is a block diagram showing a configuration of a client apparatus 200 of the wireless communication system according to the preferred embodiment of the present invention.

A configuration of a wireless communication system according to a preferred embodiment of the present invention will be described in detail below with reference to the drawings. FIGS. 1 and 2 are block diagrams showing respective configurations of a server apparatus 100 and a client apparatus 200 of a wireless communication system according to the preferred embodiment of the present invention. The wireless communication system according to the present preferred embodiment includes one server apparatus 100 and multiple client apparatuses 200.

Referring to FIG. 1, the server apparatus 100 is provided with; an encoder circuit 101 for performing an encoding process on an inputted data stream in accordance with a communication scheme such as OFDM (Orthogonal Frequency Division Multiplex); a MIMO transmission data processing circuit 102 for converting the encoded data stream into multiple data streams (three data streams in the present preferred embodiment); wireless communication circuits 103-1, 103-2, and 103-3 for performing transmission processes on the respective data streams, such as data modulation, D/A conversion, quadrature modulation, upconversion, filtering, etc.; antenna elements 104-1, 104-2, and 104-3 respectively connected to the wireless communication circuits 103-1, 103-2, and 103-3; and a controller 105 for performing a training process which will be described later. The wireless communication circuit 103-1 further receives signals transmitted from the client apparatuses 200 when performing the training process, and passes the signals to the controller 105.

Figure 7:
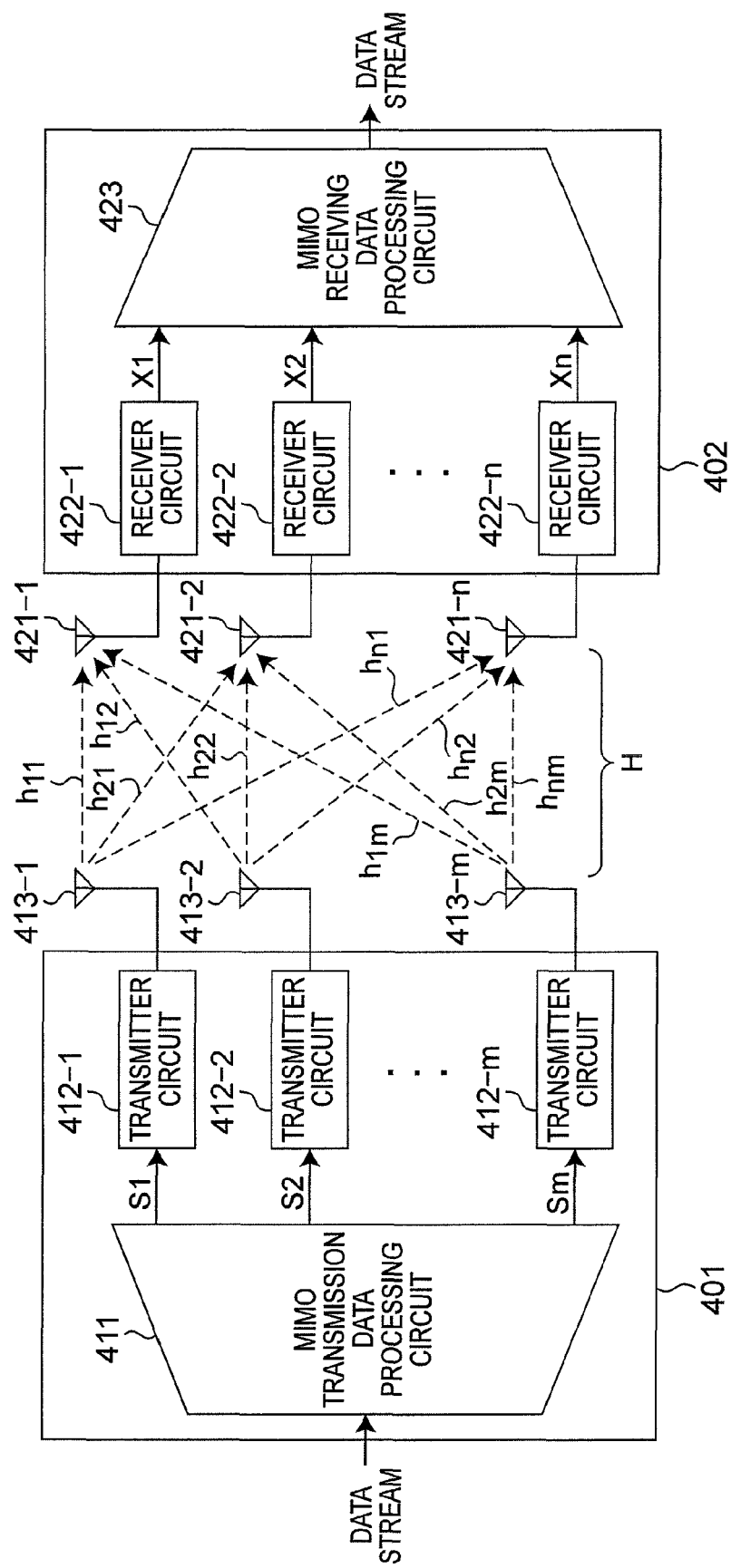
FIG. 7 is a block diagram showing a configuration of a conventional MIMO communication system.

Radio signals transmitted from the respective antenna elements 104-1 to 104-3 of the server apparatus 100 are spatially multiplexed over a propagation channel represented by a matrix H=(h$_{ij}$), 1≦i≦n, 1≦j≦m, in a similar manner as that of the prior art example described above with reference to FIG. 7, and the radio signals are received by the client apparatuses 200. In the present preferred embodiment, the number m of transmitting antenna elements of the server apparatus 100 is three, and the number n of receiving antenna elements of each client apparatus 200 is also three.

Referring to FIG. 2, each client apparatus 200 is provided with: three sets of switchable antenna elements, i.e., a set of antenna elements 201-1a and 201-1b, a set of antenna elements 201-2a and 201-2b, and a set of antenna elements 201-3a and 201-3b; switches 202-1, 202-2, and 202-3 each for selectively changing an antenna element in the corresponding set of antenna elements; wireless communication circuits 203-1, 203-2, and 203-3 for performing receiving processes on respective radio signals received by the selected antenna elements, such as filtering, downconversion, quadrature detection, A/D conversion, demodulation, etc., to generate three digitized data streams; a MIMO receiving data processing circuit 204 for obtaining one data stream from the three signals respectively processed by the wireless communication circuits 203-1, 203-2, and 203-3; a decoder circuit 205 for performing a decoding process corresponding to the encoding process of the encoder circuit 101 of the server apparatus 100, to restore an original data stream; and a controller 206 for performing a training process which will be described later. For example, the antenna elements 201-1a, 201-1b, 201-2a, 201-2b, 201-3a, and 201-3b are whip antennas, and are located at different positions on a housing of the client apparatus 200. The selection diversity is achieved by changing the switches 202-1, 202-2, and 202-3 under the control of the controller 206. Each of the wireless communication circuits 203-1, 203-2, and 203-3 performs the radio processes as described above, and further obtains a received signal strength indicator (RSSI) of the radio signal (i.e., an RSSI for the antenna element being selected when receiving the radio signal) and passes the RSSI to the controller 206. The wireless communication circuit 203-1 further transmits a signal generated by the controller 206 during the training process, to the server apparatus 100, through the switch 202-1 and one of the antenna elements 201-1a and 201-1b. The MIMO receiving data processing circuit 204 obtains one data stream from the three signals, and further computes a correlation matrix $HH^H$ of a propagation channel and passes the correlation matrix $HH^H$ to the controller 206. The decoder circuit 205 performs the decoding process as described above, and further computes a bit error rate (BER) (or a packet error rate (PER)) of the data stream as communication quality information, and passes the BER to the controller 206. The controller 206 is provided with a memory (not shown) for storing parameters of transmission path conditions (i.e., RSSI, $HH^H$, and BER) required for antenna selection.

Figure 3:
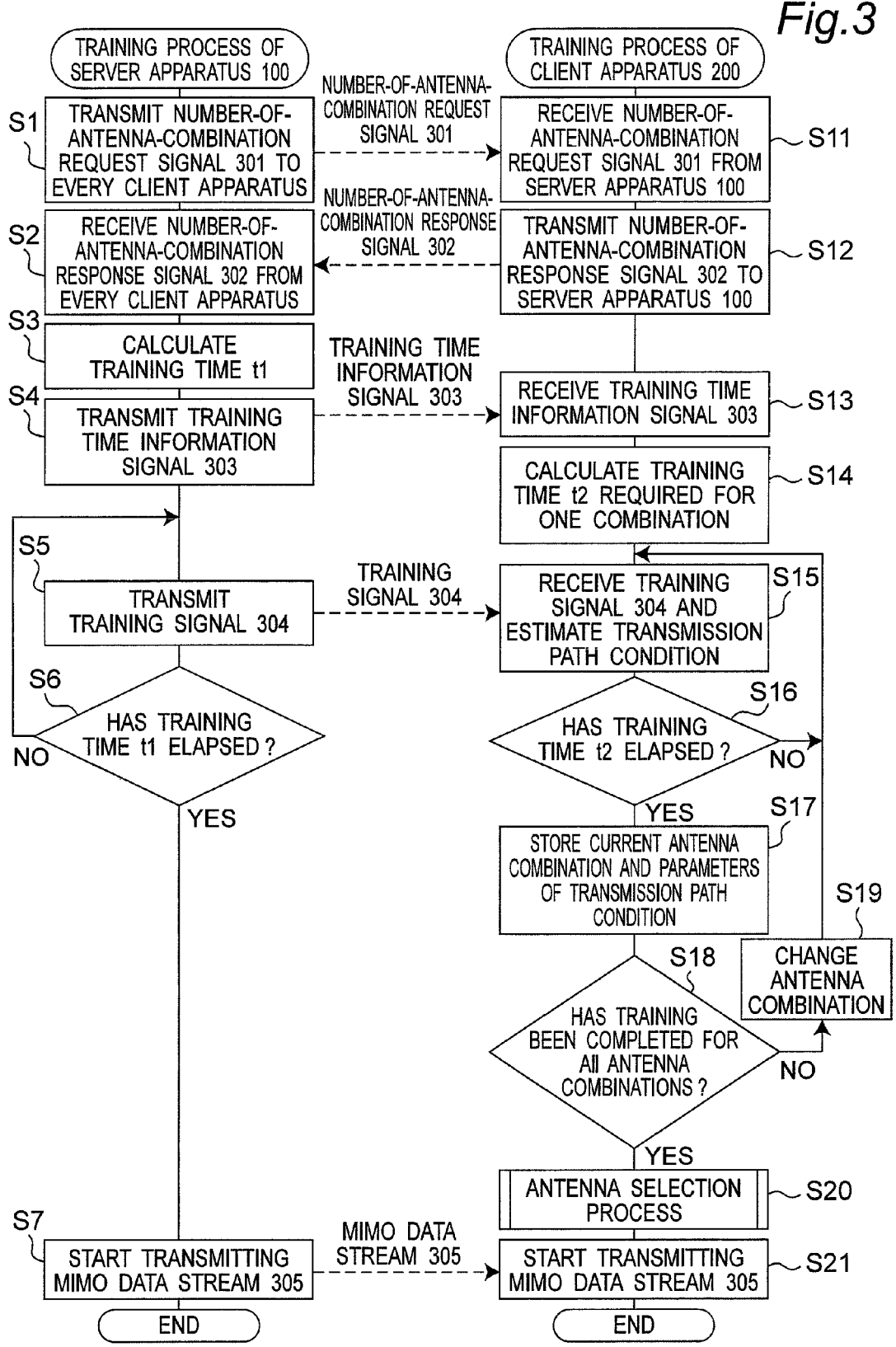
FIG. 3 is a flowchart showing a training process performed by a controller 105 of FIG. 1 and a controller 206 of FIG. 2.

Next, a method for selecting an antenna combination of one client apparatus 200 will be described. FIG. 3 is a flowchart (and a sequence diagram) showing a training process performed by the controller 105 of FIG. 1 and the controller 206 of FIG. 2.

When the server apparatus 100 detects that a data stream to be transmitted to the client apparatuses 200 has been inputted to the MIMO transmission data processing circuit 102, then in step S1, the server apparatus 100 transmits a number-of-antenna-combination request signal 301 to every client apparatus 200, requesting for information on the number of antenna combinations available for the selection diversity.

When each client apparatus 200 receives the number-of-antenna-combination request signal 301 from the server apparatus 100 in step S11, then in step S12, as a response thereto, each client apparatus 200 transmits a number-of-antenna-combination response signal 302 to the server apparatus 100, indicating a number k of its own antenna combinations. In the present preferred embodiment, the number k of antenna combinations is $2^3$=8. If the numbers of antenna combinations of all the client apparatuses 200 are known in advance, or if all the client apparatuses 200 are of the same type, this step is not required.

When the server apparatus 100 receives the number-of-antenna-combination response signal 302 from every client apparatus 200 in step S2, then in step S3, based on the received results, the server apparatus 100 determines a first training time t1 for determining priorities of antenna combinations in each of the client apparatuses 200. In step S4, the server apparatus 100 transmits a training time information signal 303 to every client apparatus 200, including information on the training time t1. The training time t1 is determined according to the maximum of the numbers of antenna combinations. For example, the training time t1 is set to the least common multiple of the numbers k of antenna combinations of all the client apparatuses 200. The training time t1 may be time information, or may be the total number of packets to be transmitted for training.

When each client apparatus 200 receives the training time information signal 303 in step S13, then in step S14, each client apparatus 200 calculates a second training time t2 required to estimate transmission path conditions for one antenna combination. The training time t2 is calculated, e.g., by the following equation:

$$t2 = t1/k \qquad (1).$$

Subsequently, in step S5, the server apparatus 100 multicast transmits a training signal 304 to every client apparatus 200, using the MIMO communication scheme.

Each client apparatus 200 selects and sets a certain combination of antenna elements. In step S15, each client apparatus 200 receives the training signal 304, and estimates transmission path conditions based on the training signal. In the estimation, the controller 206 of each client apparatus 200 obtains, as parameters of transmission path conditions, the received signal strength indicators (RSSI) respectively obtained by the wireless communication circuits 203-1, 203-2, and 203-3, the correlation matrix $HH^H$ of propagation channel computed by the MIMO receiving data processing circuit 204, and the bit error rate (BER) of the data stream computed by the decoder circuit 205. The client apparatuses 200 continue to estimate the transmission path conditions until it is determined in step S16 that the training time t2 has elapsed.

If it is determined in step S16 that the training time t2 has elapsed, then in step S17, each client apparatus 200 stores the current antenna combination and the parameters of the transmission path conditions, in the memory of the controller 206. In this case, the memory of the controller 206 stores two or more parameters of the transmission path conditions. In order for the MIMO communication scheme to ensure sufficient communication quality, it is necessary not only to achieve a certain received signal strength indicator, but also to keep the correlations between antenna elements as low as possible. Accordingly, information required as parameters of transmission path conditions includes, at least, information on individual antenna elements respectively selected by the switches 202-1, 202-2, and 202-3, and information on correlations between the antenna elements. In the present preferred embodiment, the received signal strength indicators (RSSI) are stored as information on individual antenna elements, and the correlation matrix $HH^H$ of the propagation channel is stored as information on correlations between the antenna elements, but the information to be stored is not limited them.

After each client apparatus 200 stores parameters of the transmission path conditions, then in step S18, each client apparatus 200 determines whether or not the training and estimation have been completed for all the available antenna combinations. If not completed, then the client apparatus 200 changes the antenna combination in step S19, and repeats the process of steps S15 to S17. If the process of steps S15 to S17 has been completed for all the antenna combinations, then in step S20, the client apparatus 200 performs an antenna selection process for selecting and setting an antenna combination with the best transmission path condition.

Figure 4:
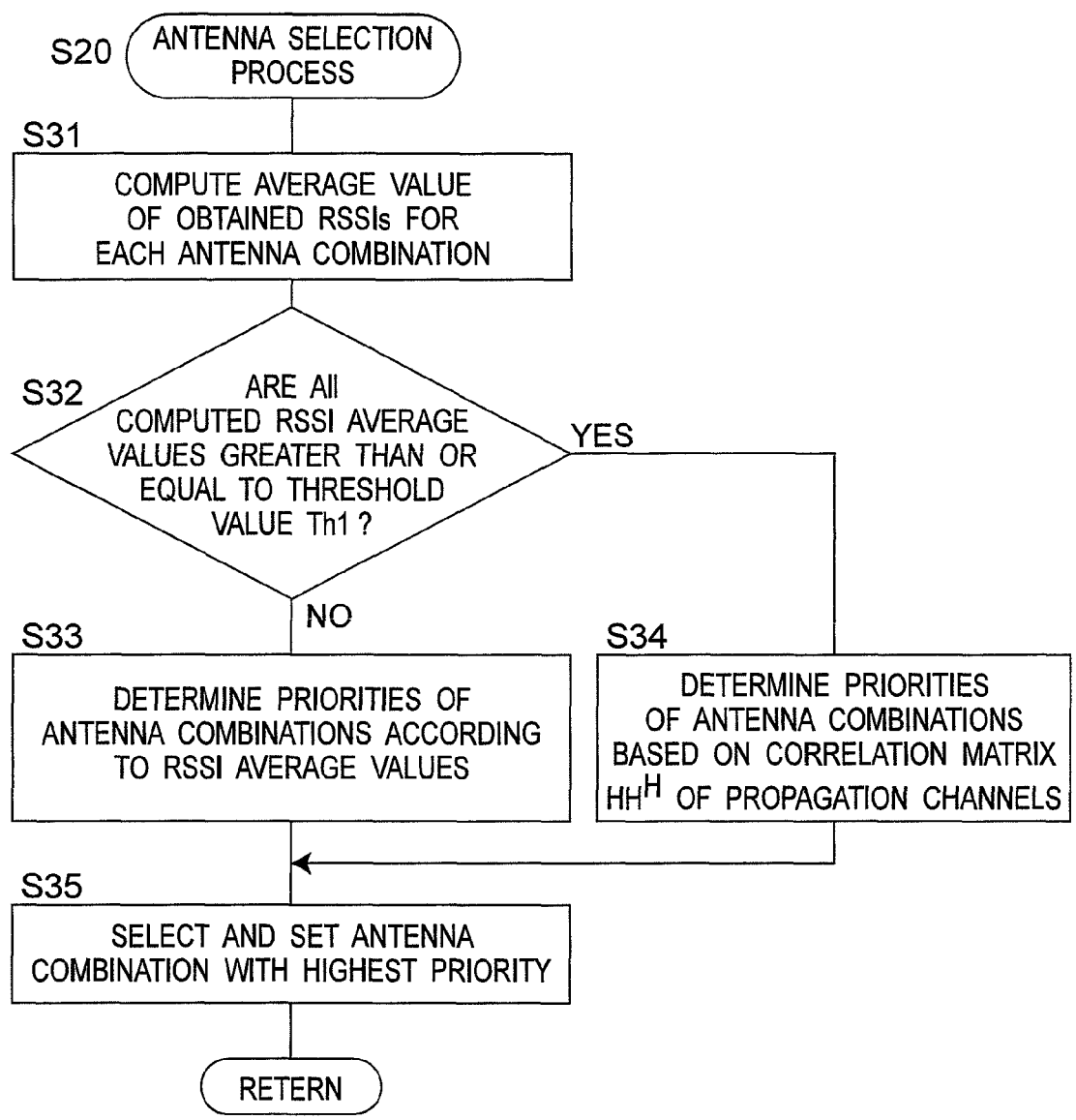
FIG. 4 is a flowchart showing a subroutine of an antenna selection process in step S20 of FIG. 3.

FIG. 4 is a flowchart showing a subroutine of the antenna selection process in step S20 of FIG. 3. In the antenna selection process, an antenna combination with the best transmission path condition is selected based on an appropriate one of parameters, i.e., an appropriate one of the received signal strength indicator (RSSI) and the correlation matrix $HH^H$ of the propagation channel, depending on a propagation environment between the server apparatus 100 and each of the client apparatuses 200. In the present preferred embodiment, when the distance between the server apparatus 100 and a client apparatus 200 is short and accordingly received signal strength indicators (RSSI) of all received radio signals are sufficiently high, the antenna combination is selected based on the correlation matrix $HH^H$ of the propagation channel. On the other hand, when the distance between the server apparatus 100 and a client apparatus 200 is long and accordingly some of received radio signals may have low received signal strength indicators (RSSI), the antenna combination is selected based on RSSI. In step S31 of FIG. 4, the controller 206 computes an average value of obtained RSSIs for each antenna combination. Subsequently, in step S32, the controller 206 determines whether or not all the computed RSSI average values are equal to or more than a predetermined threshold value Th1 (e.g., −70 dBm). If YES then the process goes to step S34, and if NO then the process goes to step S33. In step S33, the controller 206 determines priorities of the antenna combinations according to the RSSI average values. In step S34, the controller 206 determines priorities of the antenna combinations based on the correlation matrix $HH^H$ of the propagation channel. In step S34, the correlation matrix $HH^H$ of the propagation channel may be used, for example, to compute channel capacities $C_{MIMO}$ through the following equation, and the priorities of the antenna combinations may be determined according to the computed channel capacities $C_{MIMO}$.

$$C_{MIMO} = \log_2 \left| I_n + \frac{SNR}{n} HH^H \right| = \sum_{i=1}^{q} \log_2 \left(1 + \frac{SNR}{n} \lambda_i\right)$$

In the above equation, n is the number of antenna elements of a transmitter and a receiver, SNR is the total transmission signal power to noise ratio, and $\lambda_i$ is the eigenvalue of the product of the channel matrix $HH^H$. The symbol q is the rank of the channel matrix H, and it is assumed that q=n. The unit of $C_{MIMO}$ is [bit/second/Hz].

Subsequently, in step S35, the controller 206 selects and sets an antenna combination with the highest priority. After step S35, the process returns to FIG. 3.

After all the client apparatuses 200 have determined their antenna combinations in the above-described manner, i.e., after the server apparatus 100 determines in step S6 that the training time t1 has elapsed, then in steps S7 and S21, the server apparatus 100 starts transmitting a MIMO data stream 305 including video/audio data, to every client apparatus 200.

Figure 5:
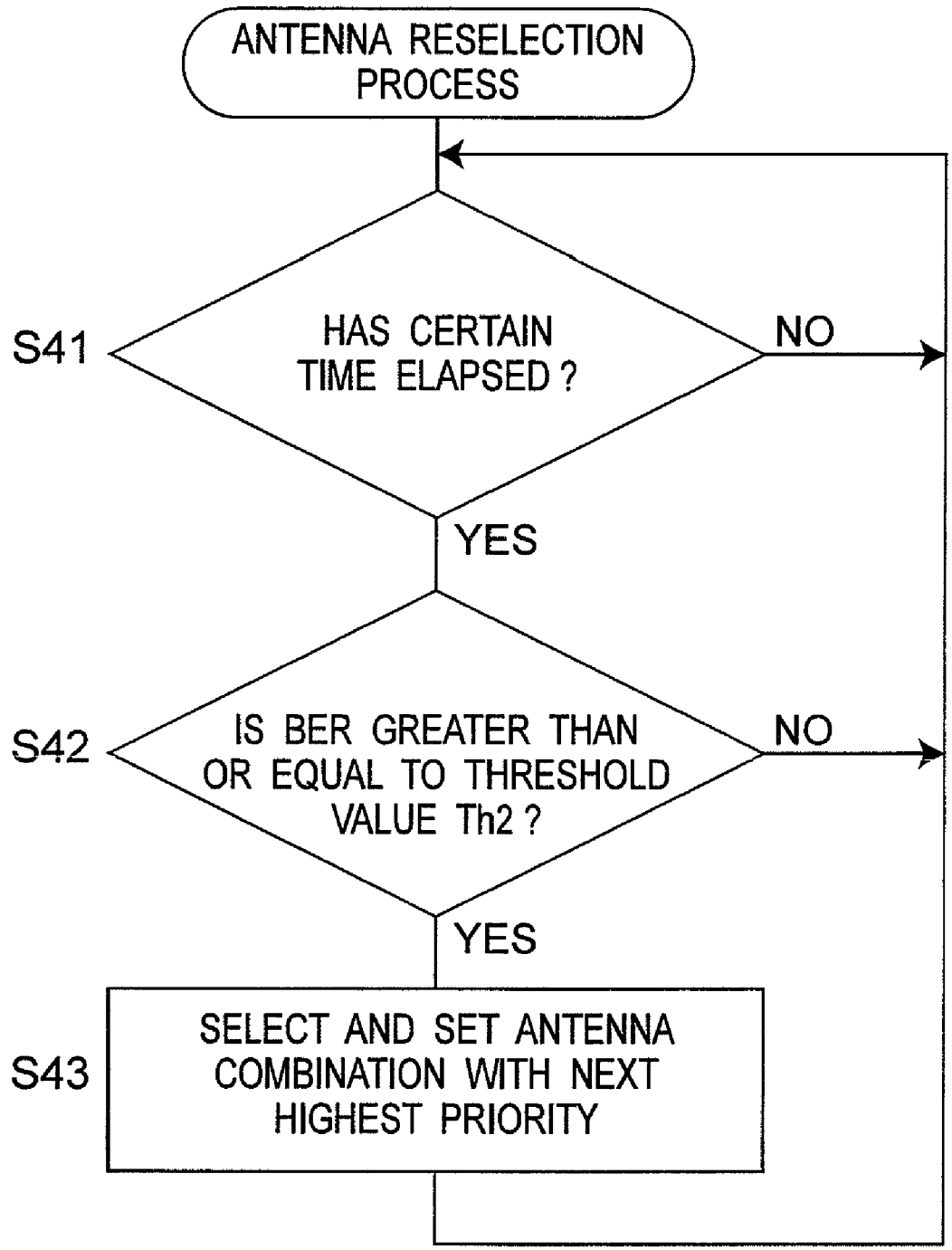
FIG. 5 is a flowchart showing an antenna reselection process performed by the controller 206 of FIG. 2 while performing step S21 of FIG. 3.

When the communication quality degrades during video/audio data streaming (i.e., when the communication quality decreases to less than a predetermined threshold value), each client apparatus 200 changes the antenna combination to a next candidate based on the parameters of the transmission path conditions stored during the training process. FIG. 5 is a flowchart showing an antenna reselection process performed by the controller 206 of FIG. 2 while performing step S21 of FIG. 3. As shown in step S41, the controller 206 performs the antenna reselection process at certain time intervals. In step S42, the controller 206 determines based on a BER (or PER) transmitted from the decoder circuit 205, whether or not the BER is equal to or more than a predetermined threshold value Th2 (e.g., by 10%). If YES then the process goes to step S43, and if NO then the process returns to step S41. In step S43, the controller 206 selects and sets an antenna combination with the next highest priority after the priority of the current antenna combination, based on the priorities of the antenna combinations determined in step S33 or S34 of FIG. 4. By reselecting the antenna combination in this manner, even when the communication quality degrades during communication, it is possible to improve the quality, thus achieving stable streaming.

Figure 6:
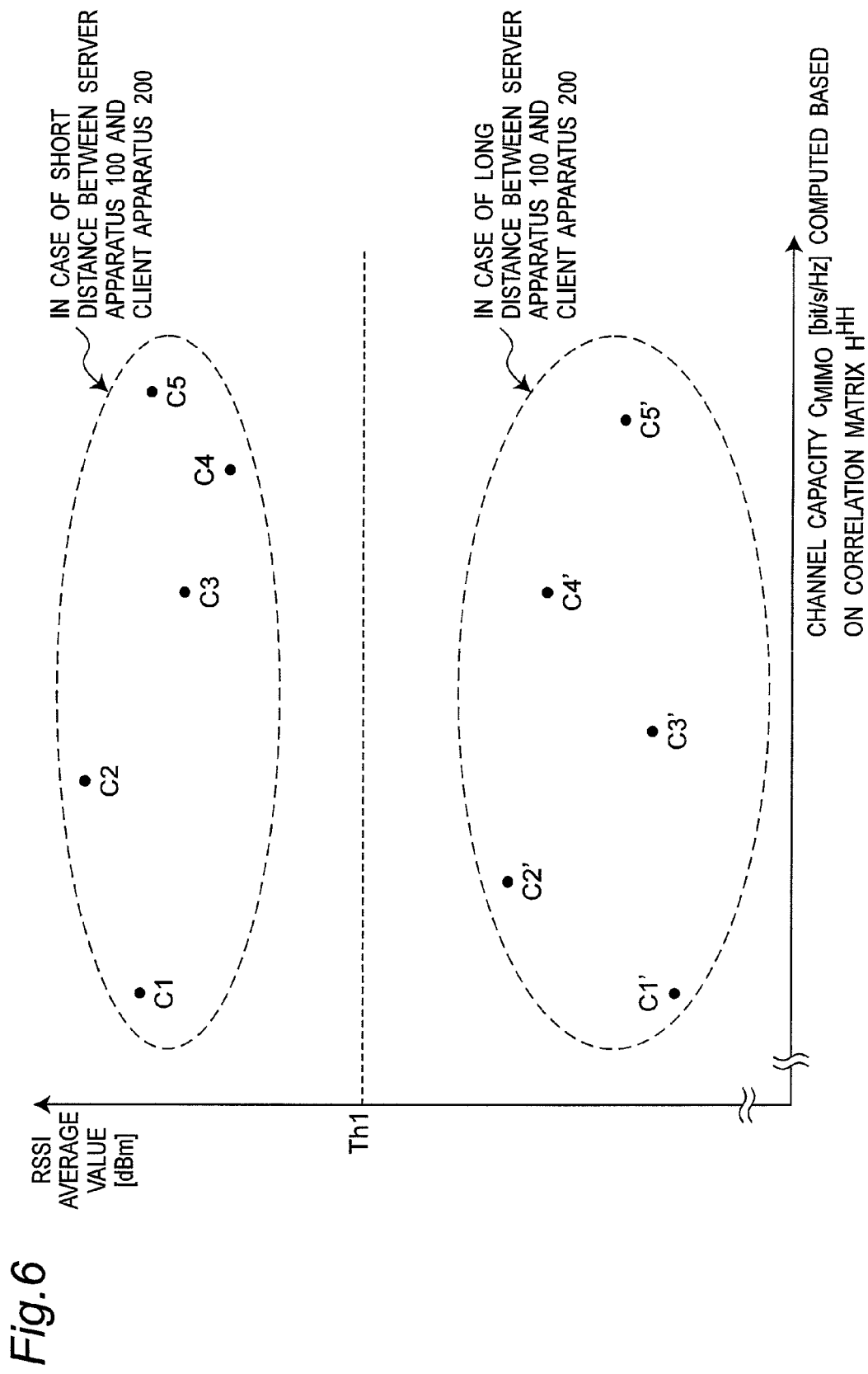
FIG. 6 is a graph showing an example of parameters of transmission path conditions for respective antenna combinations obtained by the controller 206 of FIG. 2 performing a training process of FIG. 3, and priorities of antenna combinations determined by the controller 206.

FIG. 6 is a graph showing an example of the parameters of the transmission path conditions for the respective antenna combinations obtained by the controller 206 of FIG. 2 performing the training process of FIG. 3, and the priorities of the antenna combinations determined by the controller 206. In the example of FIG. 6, it is assumed that the number of antenna combinations available to each client apparatus 200 is "5". When the distance between the server apparatus 100 and the client apparatus 200 is short, RSSI average values and channel capacities $C_{MIMO}$ for antenna combinations C1 to C5 are obtained as shown in FIG. 6. When the distance between the server apparatus 100 and the client apparatus 200 is long, RSSI average values and channel capacities $C_{MIMO}$ for antenna combinations C1' to C5' are obtained as shown in FIG. 6. In an area close to the server apparatus 100, all the antenna elements provide sufficiently high received signal strength indicators (RSSI), and thus, it is desirable to place importance on the correlation matrix $HH^H$ of the propagation channel rather than on the received signal strength indicator (RSSI). Namely, the priorities of antenna combinations are C5→C4→C3→C2→C1. In contrast, in an area far from the server apparatus 100, all the antenna elements do not have sufficiently high received signal strength indicators (RSSI), and thus, it is desired to place importance on the received signal strength indicator (RSSI) rather than on the correlation matrix $HH^H$ of the propagation channel. Namely, the priorities of antenna combinations in this case are C2'→C4'→C5'→C3'→C1'. As such, the priorities of antenna combinations vary depending on different relative positions of the server apparatus 100 and each of the client apparatuses 200. The difference in relative positions of the server apparatus 100 and each of the client apparatuses 200 (long distance or short distance) can be determined based on the RSSI threshold value Th1. In the example of FIG. 6, the client apparatus 200 located close to the server apparatus 100 selects the antenna combination C5 in the antenna selection process in step S20 of FIG. 3. and when the communication quality degrades, the client apparatus 200 changes the antenna combination from C5 to C4 by performing the antenna reselection process of FIG. 5. Similarly, the client apparatus 200 located far from the server apparatus 100 selects the antenna combination C2' in an antenna selection process in step S20 of FIG. 3, and when the communication quality degrades, the client apparatus 200 changes the antenna combination from C2' to C4' by performing the antenna reselection process of FIG. 5. By selecting the antenna combination in this manner, even when the communication quality degrades during communication, it is possible to improve the quality, thus achieving stable streaming.

Figure 8:
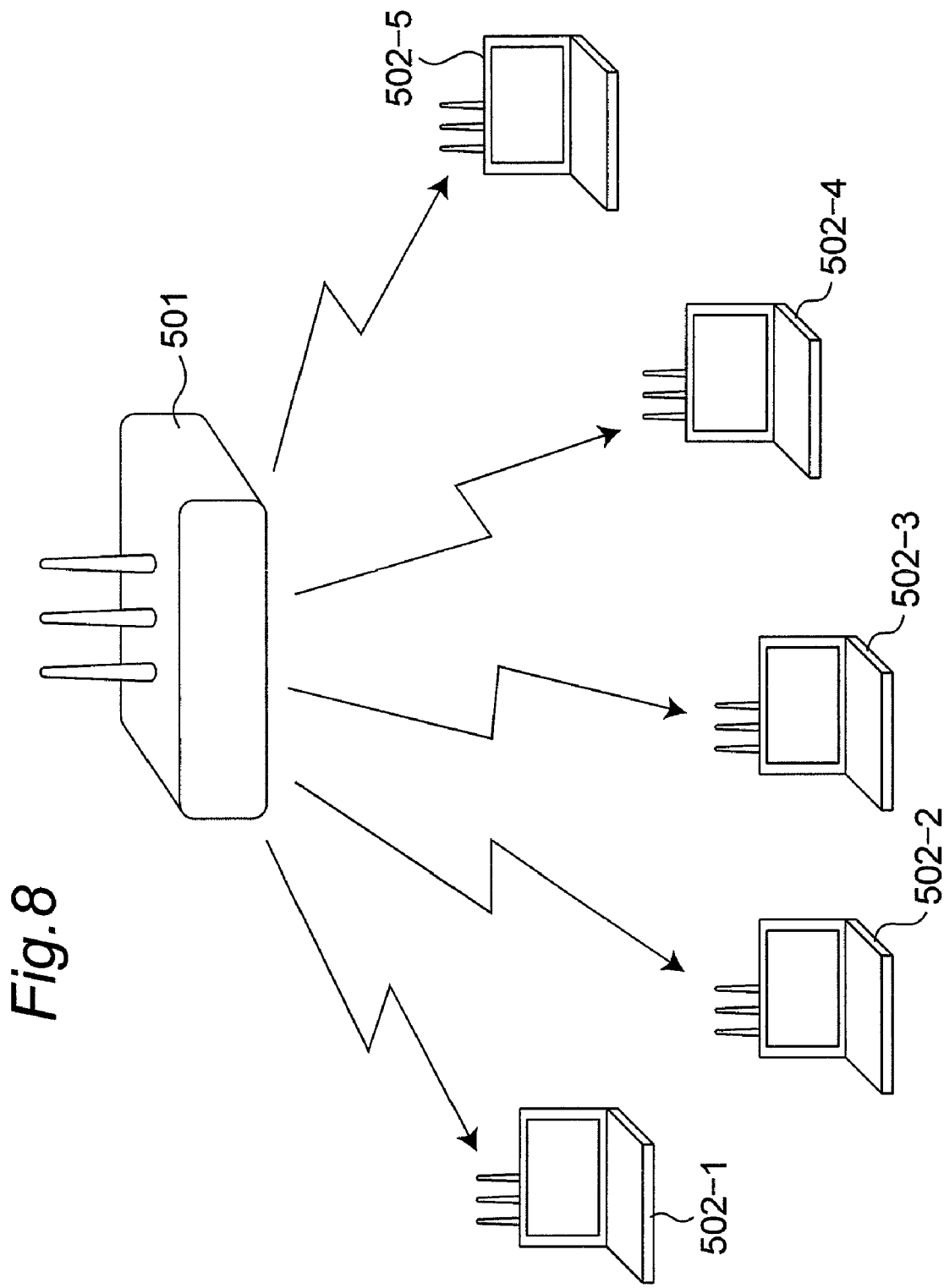
FIG. 8 is a schematic diagram showing a wireless communication system for achieving data streaming using the MIMO communication scheme.

When configuring a wireless communication system as shown in FIG. 8 from the server apparatus 100 and the client apparatuses 200 according to the above-described preferred embodiment, it is possible to select antenna elements of each of the client apparatuses 200 so as to improve the communication quality regardless of the installation locations of the client apparatuses 200.

In the above-described preferred embodiment, the server apparatus 100 is provided with the three wireless communication circuits 103-1, 103-2, and 103-3, but not limited thereto, and the server apparatus 100 may be provided with two or four or more wireless communication circuits. In addition, the signals from the client apparatuses 200 are received by the wireless communication circuit 103-1, but not limited thereto, and the signals may be received by any other wireless communication circuit and transmitted to the controller 105, or alternatively, the signals may be received by the three wireless communication circuits 103-1, 103-2, and 103-3 by the MIMO communication scheme.

In the above-described preferred embodiment, each client apparatus 200 is provided with the three wireless communication circuits 203-1, 203-2, and 203-3 and the six antenna elements, each wireless communication circuit corresponds to two selectively switchable antenna elements, but not limited thereto, and the client apparatus 200 may be provided with two or four or more wireless communication circuits, or may be configured to selectively switch three or more antenna elements. Moreover, the antenna elements included in the three sets of antenna elements of the client apparatus 200 are shown as physically different antenna elements, however, according to the present invention, it is not limited to provide each set of antenna elements as selectively switchable multiple antenna elements, each antenna element may be configured so as to change its own directivity pattern. Further, it is not limited to provide a plurality of antenna element sets each corresponding to one of the wireless communication circuits of the client apparatus 200, and the client apparatus 200 may be provided with a larger number of antennas than the number of streams to be received (i.e., the number of wireless communication circuits), and among these antennas, an arbitrary selection (combination) of antennas including a number of antennas equal to the number of streams to be received may be connected to the wireless communication circuits. Moreover, the signal to be transmitted to the server apparatus 100 is transmitted by the wireless communication circuit 203-1, but not limited thereto, and the signal may be transmitted by any other wireless communication circuit, or alternatively, the signal may be transmitted by the three wireless communication circuits 203-1, 203-2, and 203-3 by the MIMO communication scheme.

Industrial Applicability

According to the wireless communication method and the wireless communication system of the present invention, in a wireless communication system having a MIMO communication capability and having multiple receiving antennas to be selected, the training process for antenna selection can be performed for multiple wireless client apparatuses simultaneously, thus reducing the time required for the training process. In addition, the wireless communication method and the wireless communication system according to the present invention can appropriately select receiving antennas of a wireless client apparatus according to the transmission path conditions between a wireless server apparatus and the wireless client apparatus, and can efficiently determine a combination of receiving antennas of the wireless client apparatus to be selected next when the communication quality degrades. Accordingly, the wireless communication method and the wireless communication system can be applied to video distribution service and the like, particularly in public transport and public facilities with fixed installation locations for wireless client apparatuses, thus achieving high quality video distribution in an always stable communication environment.

The invention claimed is:

1. A wireless communication method for distributing a data stream from a wireless server apparatus to a plurality of wireless client apparatuses using a Multiple-Input Multiple-Output (MIMO) wireless transmission scheme,
   each of the wireless client apparatuses comprising a larger number of antennas than the number of streams to be received by the wireless client apparatus, and among the antennas, selectively using a combination of antennas including a number of antennas whose number is equal to the number of the streams to be received,
   the method comprising the steps of, before start of streaming of the data stream:
   requesting, by the wireless server apparatus, the plurality of wireless client apparatuses for the number of antenna combinations;
   returning, by each of the wireless client apparatuses, the number of antenna combinations to the wireless server apparatus;
   determining, by the wireless server apparatus, a first training time according to the maximum of the returned numbers of antenna combinations, and notifying each of the wireless client apparatuses of the determined first training time;
   determining, by each of the wireless client apparatuses, a second training time required to estimate transmission path conditions between the wireless server apparatus and the wireless client apparatus for one antenna combination, based on the notified first training time;
   transmitting, by the wireless server apparatus, a training signal to each of the wireless client apparatuses during the first training time;
   estimating, by each of the wireless client apparatuses, the transmission path conditions using the training signal during the second training time for each of the antenna combinations; and
   selecting and setting, by each of the wireless client apparatuses, the antenna combination based on the estimated transmission path conditions.

2. The wireless communication method as claimed in claim 1, wherein the transmission path conditions are estimated by evaluating at least two parameters of the transmission path conditions.

3. The wireless communication method as claimed in claim 2, wherein the parameters of the transmission path conditions include a parameter related to each of the antennas and a parameter related to correlations between the antennas.

4. The wireless communication method as claimed in claim 3, further comprising the step of determining, by each of the wireless client apparatuses, priorities of the antenna combinations based on one of the parameters of the transmission path conditions.

5. The wireless communication method as claimed in claim 4, further comprising the step of selecting and setting, by each of the wireless client apparatuses, an antenna combination with the next highest priority after a current antenna combination based on the determined priorities of the antenna combinations, when the communication quality degrades.

6. A wireless communication system that distributes a data stream from a wireless server apparatus to a plurality of wireless client apparatuses using a Multiple-Input Multiple-Output (MIMO) wireless transmission scheme,
   each of the wireless client apparatuses comprising a larger number of antennas than the number of streams to be received by the wireless client apparatus, and among the antennas, selectively using a combination of antennas including a number of antennas whose number is equal to the number of the streams to be received,
   before start of streaming of the data stream,
   the wireless server apparatus requests the plurality of wireless client apparatuses for the number of antenna combinations,
   each of the wireless client apparatuses returns the number of antenna combinations to the wireless server apparatus,
   the wireless server apparatus determines a first training time according to the maximum of the returned numbers of antenna combinations, and notifies each of the wireless client apparatuses of the determined first training time,
   each of the wireless client apparatuses determines a second training time required to estimate transmission path conditions between the wireless server apparatus and the wireless client apparatus for one antenna combination, based on the notified first training time,
   the wireless server apparatus transmits a training signal to each of the wireless client apparatuses during the first training time,
   each of the wireless client apparatuses estimates the transmission path conditions using the training signal during the second training time for each of the antenna combinations, and
   each of the wireless client apparatuses selects and sets the antenna combination based on the estimated transmission path conditions.

7. The wireless communication system as claimed in claim 6, wherein the transmission path conditions are estimated by evaluating at least two parameters of the transmission path conditions.

8. The wireless communication system as claimed in claim 7, wherein the parameters of the transmission path conditions include a parameter related to each of the antennas and a parameter related to correlations between the antennas.

9. The wireless communication system as claimed in claim 8, wherein each of the wireless client apparatuses determines priorities of the antenna combinations based on one of the parameters of the transmission path conditions.

10. The wireless communication system as claimed in claim 9, wherein each of the wireless client apparatuses selects and sets an antenna combination with the next highest priority after a current antenna combination based on the determined priorities of the antenna combinations, when communication quality degrades.

* * * * *